United States Patent
Tan et al.

(10) Patent No.: US 8,014,181 B2
(45) Date of Patent: Sep. 6, 2011

(54) POWER CONVERSION CONTROL SYSTEM

(75) Inventors: Zhuohui Tan, Shanghai (CN); Robert William Delmerico, Clifton Park, NY (US); Xiaoming Yuan, Shanghai (CN); Haiqing Weng, Shanghai (CN)

(73) Assignee: General Electric Company, Niskayuna, NY (US)

( * ) Notice: Subject to any disclaimer, the term of this patent is extended or adjusted under 35 U.S.C. 154(b) by 65 days.

(21) Appl. No.: 12/569,160

(22) Filed: Sep. 29, 2009

(65) Prior Publication Data

US 2011/0075456 A1    Mar. 31, 2011

(51) Int. Cl.
*H02M 7/5383* (2007.01)
*H03L 7/00* (2006.01)

(52) U.S. Cl. .......................................... 363/74; 327/156
(58) Field of Classification Search .................. 363/39, 363/74, 98; 327/147, 156; 307/11, 18, 22, 307/87; 323/284, 286
See application file for complete search history.

(56) References Cited

U.S. PATENT DOCUMENTS

| | | | |
|---|---|---|---|
| 4,385,241 A | | 5/1983 | Peddie et al. |
| 4,667,283 A | * | 5/1987 | Seki et al. ........................ 363/95 |
| 5,117,204 A | * | 5/1992 | Endo et al. ........................ 331/8 |
| 5,191,519 A | * | 3/1993 | Kawakami ...................... 363/71 |
| 5,227,713 A | * | 7/1993 | Bowler et al. ................... 322/58 |
| 5,798,633 A | | 8/1998 | Larsen et al. |
| 6,084,791 A | * | 7/2000 | Gopfrich .......................... 363/98 |
| 6,348,780 B1 | | 2/2002 | Grant |
| 7,058,373 B2 | * | 6/2006 | Grigore ...................... 455/127.1 |
| 7,109,693 B2 | * | 9/2006 | Yoshida et al. ................. 323/282 |
| 7,450,405 B2 | * | 11/2008 | Ponnaluri et al. ............... 363/40 |
| 7,457,140 B2 | * | 11/2008 | Klein .............................. 363/132 |
| 7,493,504 B2 | * | 2/2009 | Chapuis .......................... 713/300 |
| 7,511,543 B2 | | 3/2009 | Friedman et al. |
| 2003/0165036 A1 | | 9/2003 | Tuladhar |
| 2005/0207190 A1 | | 9/2005 | Gritter |

FOREIGN PATENT DOCUMENTS

| EP | 0455181 B1 | 7/1995 |
|---|---|---|
| EP | 0292935 B1 | 8/1995 |

OTHER PUBLICATIONS

Xiaoming (nmn) Yuan et al., "Phase-Locked-Loop Circuit," U.S. Appl. No. 12/569,119, filed Sep. 29, 2009, General Electric.
EP 10178723 Search Report, Feb. 20, 2011.

* cited by examiner

*Primary Examiner* — Adolf Berhane
(74) *Attorney, Agent, or Firm* — Ann M. Agosti

(57) ABSTRACT

A power distribution system comprises a power conversion module for performing power conversion between a DC voltage at a DC side and an AC power at an AC side, and a conversion control system. The AC side of the power conversion module is electrically coupled to a grid. The conversion control system includes a phase-locked-loop circuit for receiving a multi-phase reference signal of a grid voltage and for generating a synchronized signal, a regulator for receiving reference commands, a two-phase grid feedback signal, and the synchronized signal and for generating a control signal for the power conversion module, and a phase compensation circuit for receiving the synchronized signal and the multi-phase reference signal of the grid voltage, for obtaining a phase displacement signal, and for generating a phase compensation signal for compensating the reference commands or for compensating the synchronized signal when the phase displacement signal exceeds a threshold value.

19 Claims, 3 Drawing Sheets

POWER CONVERSION CONTROL SYSTEM

BACKGROUND

The invention relates generally to power conversion control systems.

A typical power distribution system comprises a power conversion module with a DC side and an AC side, a grid electrically coupled to the AC side of the power conversion module, a power distribution unit electrically coupled to the DC side of the power conversion module, and a conversion control system for performing control of the power conversion module. Conversion control systems typically comprise phase-locked-loop (PLL) circuits for generating synchronized phase and frequency signals.

A PLL circuit is typically a closed loop circuit and works well under substantially steady operating conditions of the power distribution system. However, when a transient condition, such as Low voltage ride through (LVRT), Zero Voltage Ride Through (ZVRT), or High Voltage Ride Through (HVRT) occurs, the grid voltage has a significant phase jump, and the PLL circuit may fail to provide a fast enough response to prevent reversed flow of active power or may result in inappropriate reactive power control in the power system.

It would be desirable to have an improved power conversion control system and method with fast responses to transient conditions.

BRIEF DESCRIPTION

In accordance with an embodiment disclosed herein, a power distribution system comprises a power conversion module for performing power conversion between a DC voltage at a DC side and an AC power at an AC side, and a conversion control system. The AC side of the power conversion module is electrically coupled to a grid. The conversion control system includes a phase-locked-loop circuit for receiving a multi-phase reference signal of a grid voltage and for generating a synchronized signal, a regulator for receiving reference commands, a two-phase grid feedback signal, and the synchronized signal and for generating a control signal for the power conversion module, and a phase compensation circuit for receiving the synchronized signal and the multi-phase reference signal of the grid voltage, for obtaining a phase displacement signal, and for generating a phase compensation signal for compensating the reference commands or for compensating the synchronized signal when the phase displacement signal exceeds a threshold value.

In accordance with another embodiment disclosed herein, a phase tracking circuit comprises a phase-locked-loop circuit and a phase-compensation circuit. The phase-locked-loop circuit includes a phase detector for receiving a multi-phase reference signal and feedback phase signal, for performing a rotational transformation to convert the multi-phase reference signal into a two-phase signal in a two-phase direct and quadrature reference frame, and for generating a phase error signal, a phase regulator for receiving the phase error signal and generating a synchronized frequency signal, and an integrator for receiving the synchronized frequency signal and generating a synchronized phase signal. The phase-compensation circuit includes a fast-phase-error-detector for receiving the synchronized phase signal and the multi-phase reference signal, for generating a phase displacement signal, and for generating a phase compensation signal for compensating the synchronized phase signal from the phase-locked-loop circuit when the phase displacement signal exceeds a threshold value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein relate to a multi-phase power distribution system comprising a power conversion module and a conversion control system. The conversion control system comprises a phase-locked-loop (PLL) circuit for generating a synchronized phase and frequency signal of a grid voltage. In certain embodiments, the power distribution system comprises a power distribution unit electrically coupled to a DC side of the power conversion module. In other embodiments, the power distribution system comprises a load coupled to the DC side of the power conversion module. The conversion control system also comprises a phase compensation circuit for tracking a phase displacement between an instantaneous reference phase of the grid and the synchronized phase signal from the PLL circuit and for sending a phase compensation signal when the phase displacement exceeds a threshold value. Accordingly, the conversion control system provides for smooth control even under transient grid conditions, such as Low Voltage Ride Through (LVRT), Zero Voltage Ride Through (ZVRT), and High Voltage Ride Through (HVRT). Although embodiments of the power distribution system are shown as three-phase systems, it is understood that the power distribution system may comprise other multi-phase systems.

Figure 1:
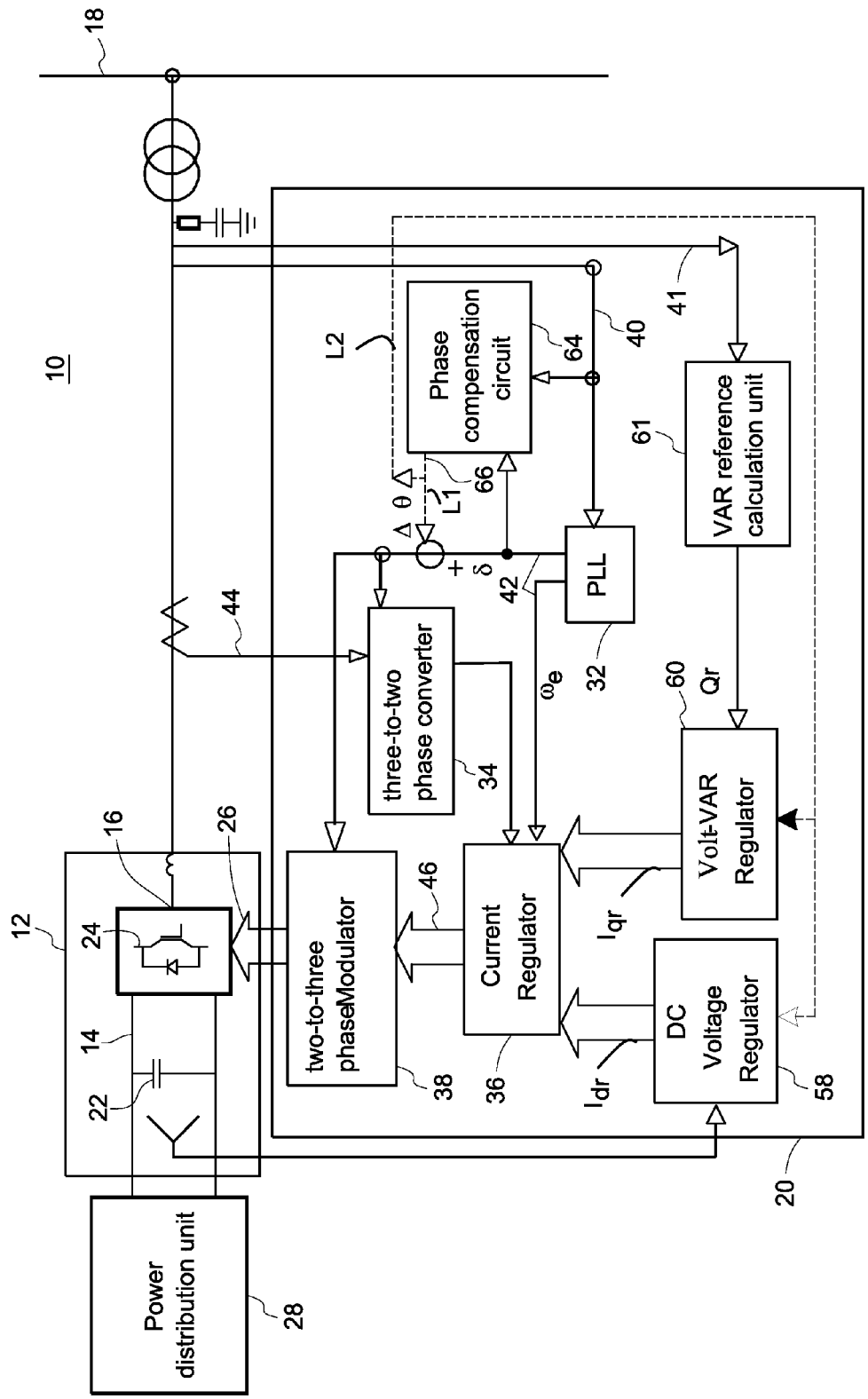
FIG. 1 is a block diagram of an exemplary power distribution system according to one embodiment of the invention.

Referring to FIG. 1, an exemplary three-phase power distribution system 10 according to one embodiment of the invention comprises a power conversion module 12 with a DC side 14 and a three phase AC side 16. A grid 18 is electrically coupled to AC side 16 of the power conversion module 12. A conversion control system 20 is provided for performing control of the power conversion module 12. In the illustrated embodiment, DC side 14 of power conversion module 12 comprises a voltage supporting device such as a capacitor 22. In certain embodiments, power conversion module 12 comprises a plurality of semiconductive switches 24 such as Integrated Gate Commutated Thyristors (IGCTs) and/or Insulated Gate Bipolar Transistors IGBTs, and the conversion control system 20 sends control signals 26 for controlling turn-on or turn-off of the semiconductive switches 24. A power distribution unit 28 is electrically coupled to DC side 14 of power conversion module 12.

In one embodiment, power distribution system 10 is a power generation system, and power distribution unit 28 comprises a power distribution unit. In one embodiment, power distribution unit 28 comprises a wind power distribution unit and includes elements such as rotating blades, a generator for converting the mechanical power from the rotating blades to AC power, and an AC to DC converter for converting the AC power to DC power. In another embodiment, the power distribution unit 28 comprises a solar power distribution unit and includes elements such as solar cells for converting sunlight to DC power. In other embodiments, the power distribution unit 28 may comprise other types of energy sources such as batteries or nuclear energy, for example. In another embodiment, the power distribution unit 28 comprises a load such as a motor electrically coupled to the DC side of the power conversion module 12, and grid 18 transmits power to the load through power conversion module 12.

In certain embodiments, with reference to FIG. 1, conversion control system 20 comprises a PLL circuit 32, a three-to-two phase converter 34, a current regulator 36, and a two-to-three phase modulator 38. PLL circuit 32 receives an instantaneous three-phase reference voltage signal 40 and generates an output signal 42 comprising a synchronized frequency signal ($\omega_e$) and a synchronized phase signal ($\delta$). Three-to-two phase converter 34 receives the synchronized phase signal ($\delta$) from PLL circuit 32 and a measured three-phase current feedback signal 44 in a three-phase a-b-c reference frame from an output of the power conversion module 12 and transforms three-phase quantities of the three-phase feedback current signal 44 into two-phase quantities $i_d$ and $i_q$ in a synchronously rotating two-phase direct and quadrature (d-q) reference frame. Current regulator 36 receives the two-phase quantities $i_d$, $i_q$, $I_{dr}$ and $I_{qr}$ command inputs, and the synchronized frequency signal ($\omega_e$) and generates a two-phase converter control signal 46. Two-to-three phase modulator 38 converts the two-phase converter control signal 46 back into a three-phase control signal and further generates control signal 26 for semiconductive switches 24.

Figure 2:
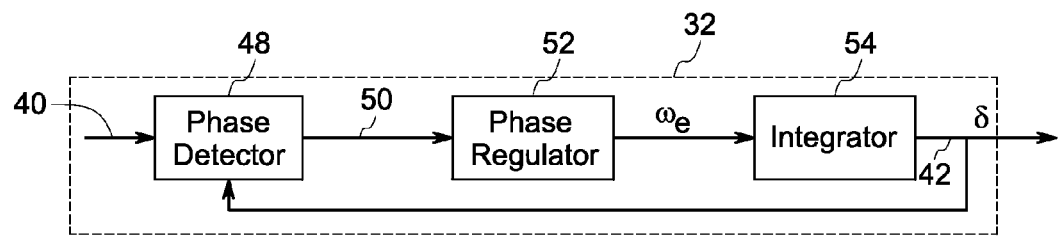
FIG. 2 is a block diagram of an exemplary phase-locked-loop (PLL) circuit in the power distribution system of FIG. 1.

PLL circuit 32 may comprise any appropriate phase locking technique. An exemplary PLL circuit 32 is illustrated in FIG. 2 wherein the PLL circuit 32 comprises a closed-loop circuit with a phase detector 48 receiving three-phase reference voltage signal 40 and output signal 42 of PLL circuit 32 and using these signals to generate a phase error signal 50. A phase regulator 52 determines the synchronized frequency signal ($\omega_e$) based on the phase error signal 50, and an integrator 54 generates the synchronized phase signal ($\delta$) 42. In an alternative embodiment, the PLL circuit may be of types described and illustrated in commonly assigned U.S. patent application entitled "PHASE-LOCKED-LOOP CIRCUIT" filed on the same day with the instant application, the disclosure of which is incorporated herein by reference.

When reference voltage signal 40 comprises a three-phase voltage phasor ($V_a$, $V_b$, and $V_c$), it can be expressed as below:

$$\begin{bmatrix} V_a \\ V_b \\ V_c \end{bmatrix} = V_m \times \begin{bmatrix} \sin\omega t \\ \sin(\omega t - 2\pi/3) \\ \sin(\omega t + 2\pi/3) \end{bmatrix}$$

wherein "$V_m$" is a voltage amplitude of positive sequence, and "$\omega$" is a fundamental rotation speed of the three-phase voltage phasor (($V_a$, $V_b$, and $V_c$).

Generation of phase error signal 50 by phase detector 48 typically comprises a rotational transformation. Phase detector 48 may transform the three-phase reference voltage signal ($V_a$, $V_b$, $V_c$) 40 into a two-phase α-β reference frame according to the equation below for example:

$$\begin{bmatrix} V_\alpha \\ V_\beta \end{bmatrix} = \frac{2}{3} \times \begin{bmatrix} 1 & -0.5 & -0.5 \\ 0 & -\frac{\sqrt{3}}{2} & \frac{\sqrt{3}}{2} \end{bmatrix} \begin{bmatrix} V_a \\ V_b \\ V_c \end{bmatrix} = \begin{bmatrix} V_m \times \cos\Phi \\ V_m \times \sin\Phi \end{bmatrix}, \Phi = \omega \times t + \Phi_0$$

wherein "$\omega$" is a rotation frequency of the three-phase reference signal 40, "$\Phi$" is an instantaneous phase angle of the reference signal 40, and $\Phi_0$ is an initial phase angle of the reference phase signal 40. Then, the two-reference frame α-β may be transformed into synchronous rotating reference frame quantities $V_d$ and $V_q$ according to:

$$\begin{bmatrix} V_d \\ V_q \end{bmatrix} = \begin{bmatrix} \cos\delta & \sin\delta \\ -\sin\delta & \cos\delta \end{bmatrix} \begin{bmatrix} V_\alpha \\ V_\beta \end{bmatrix}, \delta = \omega_e \times t + \delta_0$$

wherein "$\delta$" is an instantaneous synchronized phase angle, $\delta_0$ is an initial synchronized phase angle, and "$\omega_e$" is a synchronized rotation speed, and thus:

$V_d = V_\alpha \times \cos\delta + V_\beta \times \sin\delta = V_m \times \cos\Phi \cos\delta + V_m \times \sin\Phi \sin\delta = V_m \times \cos(\Phi-\delta) = V_m \times \cos\theta$ $V_q = V_\alpha \times (-\sin\delta) + V_\beta \times \cos\delta = V_m \times \cos\Phi(-\sin\delta) + V_m \times \sin\Phi\cos\delta = V_m \times \sin(\Phi-\delta) = V_m \times \sin\theta$ wherein "$\theta$" is a phase error between the phase ($\Phi$) of reference voltage signal ($V_a$, $V_b$, $V_c$) 40 and the synchronized phase ($\delta$), i.e. $\theta = \Phi - \delta$. The phase error signal 50 from phase detector 12 is typically the value of $V_q$. If $V_q = 0$, that is, a phase lock status, no adjustment is needed. If $V_q \neq 0$, there is a margin of adjustment, so phase regulator 52 accordingly adjusts the synchronized rotation frequency ($\omega_e$), and integrator 54 accordingly generates the time-varying synchronized phase signal ($\delta$). The synchronized phase signal ($\delta$) is sent to three-to-two phase converter 34, and the synchronized frequency signal is ($\omega_e$)) is sent to current regulator 36.

Referring back to FIG. 1, in the illustrated embodiment, three-phase current feedback signal 44 received by three-to-two phase converter 34 comprises three phase quantities ($i_a$, $i_b$, $i_c$) at the three-phase output of power conversion module 12. The measured three-phase quantities ($i_a$, $i_b$, $i_c$) and the time-varying phase signal ($\delta$) from PLL circuit 32 are used for converting the three-phase quantities ($i_a$, $i_b$, $i_c$) into two-phase quantities ($i_q$, $i_d$) in a synchronous two-phase d-q reference frame.

In the illustrated embodiment of FIG. 1, conversion control system 20 further comprises a DC voltage regulator 58 and a volt-VAR regulator 60 respectively for transmitting an $I_{dr}$ command and an $I_{qr}$ command to current regulator 36. During steady state operation of power distribution system 10, DC voltage regulator 58 receives an instantaneous DC voltage signal $V_{dc}$ measured across capacitor 22 at DC side of power conversion module 12. DC voltage signal $V_{dc}$ is changed by an active power (P) flowing through the power conversion module 12, and it is desired to maintain the DC voltage signal $V_{dc}$ at a desired value. Volt-VAR regulator 60 receives an instantaneous measured reactive power signal such as a reactive power ($Q_r$)) calculated from the reference voltage signal or a power factor from an output signal of the power conversion module 12. In one embodiment, conversion control system 20 comprises a VAR reference calculation unit 61 for receiving measured three-phase current and voltage signals

41 of the grid and calculating a reference reactive power ($Q_r$). Volt-VAR regulator 60 uses the reference reactive power ($Q_r$) to generate an $I_{qr}$ command for current regulator 36.

Current regulator 36 receives the two-phase currents ($i_d$, $i_q$) from three-to-two phase converter 34, the synchronized frequency signal ($\omega_e$) from PLL circuit 32, and the ($i_d$, $i_q$) commands respectively from DC voltage regulator 58 and the volt-VAR regulator 60, and then generates a two-phase converter control signal 46 which is transmitted to the two-three phase converter 38. Two-to-three phase converter 38 in turn converts the two-phase converter control signal 46 into a three-phase voltage signal and further generates a converter signal 26 by, for example, interacting the three-phase voltage signal with a triangle waveform to generate a series of pulse signals (converter signal) to drive the semiconductive switches 24 of the power conversion module 12.

Figure 3:
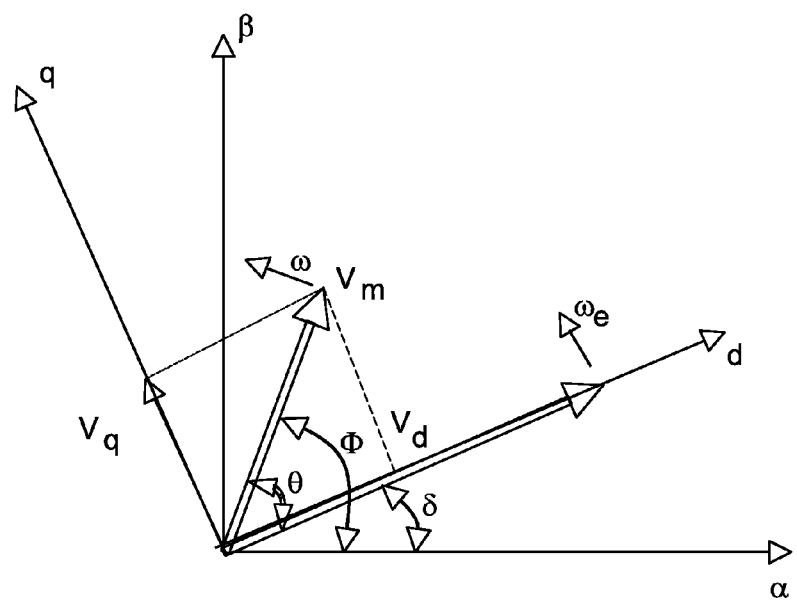
FIG. 3 is a vector diagram illustrating a rotational transformation performed by a phase detector of the PLL circuit in FIG. 2.
Figure 4:
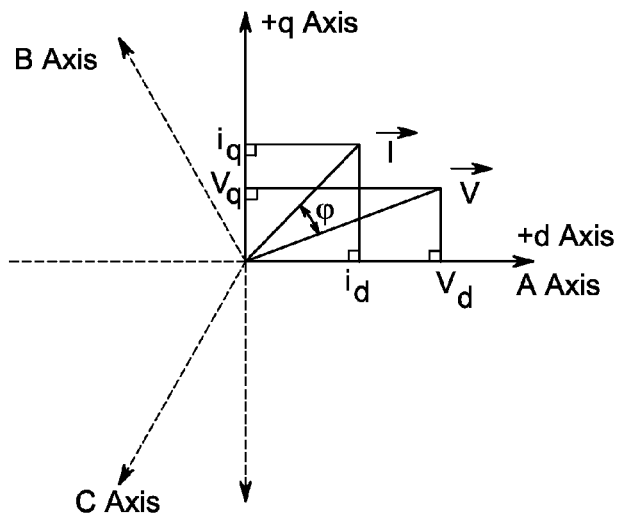
FIG. 4 is a vector diagram illustrating voltage and current signals in a two-phase d-q reference frame.

As is best seen in FIGS. 3 and 4, two-phase voltage signals ($V_d$, $V_q$) can be expressed as a voltage vector $\vec{V}$, and two-phase current signals ($i_d$, $i_q$) can be expressed as a current vector $\vec{I}$. The voltage vector $\vec{V}$ and current vector $\vec{I}$ have a phase displacement ($\phi$). Active power (P) and reactive power (Q) of the power distribution system are respectively according to the following equations:

$$P = \frac{3}{2}(V_d \times i_d + V_q \times i_q)$$

$$Q = \frac{3}{2}(V_q \times i_d + V_d \times i_q)$$

As $V_q$ is controlled to be substantially equal to zero, and thus the preceding equations for real power (P) and reactive power (Q) can be expressed as:

$$P \cong \frac{3}{2}(V_d \times i_d)$$

$$Q \cong \frac{3}{2}(V_d \times i_q)$$

Accordingly, current $I_d$ is an "active current" affecting active power (P), and $i_q$ is a "reactive current" related to reactive power (Q).

In a stable operation of the power distribution system 10 of FIG. 1, when operating as a power generation system, power distribution unit 28 feeds power to grid 18, i.e. P>0. Accordingly it is desired the phase displacement ($\phi$) of the phasors $\vec{V}$ and $\vec{I}$ be less than 90 degrees and be generally controlled to be less than a smaller value, such as 30 degrees. However, when a grid dynamic event, such as one or more of Low Voltage Ride Through (LVRT), Zero Voltage Ride Through (ZVRT), or High Voltage Ride Through (HVRT) occurs, the grid voltage has a significant phase jump. During such phase jumps, PLL circuit 32 may fail to operate as quickly as desired. Failure of PLL circuit 32 in response to transient events may result in a phase displacement ($\phi$) exceeding 90 degrees and a reversed flow of active power (P), and also incorrect reactive power control.

With continued reference to FIG. 1, in certain embodiments, the power distribution system 10 further comprises a phase compensation circuit 64 for tracking an instantaneous phase of grid voltage, for comparing the instantaneous phase with the synchronized phase signal ($\delta$) from PLL circuit 32 to obtain a phase error therebetween, and for generating a compensation phase signal ($\Delta\theta$) 66 when the phase error exceeds a threshold phase error value $\theta_t$. The compensation phase signal ($\Delta\theta$) 66 may be sent to compensate the phase signal ($\delta$) of PLL circuit 32 through route L1 and/or may be sent to adjust the reference active and reactive current commands ($I_{dr}$, $I_{qr}$) through route L2.

Figure 5:
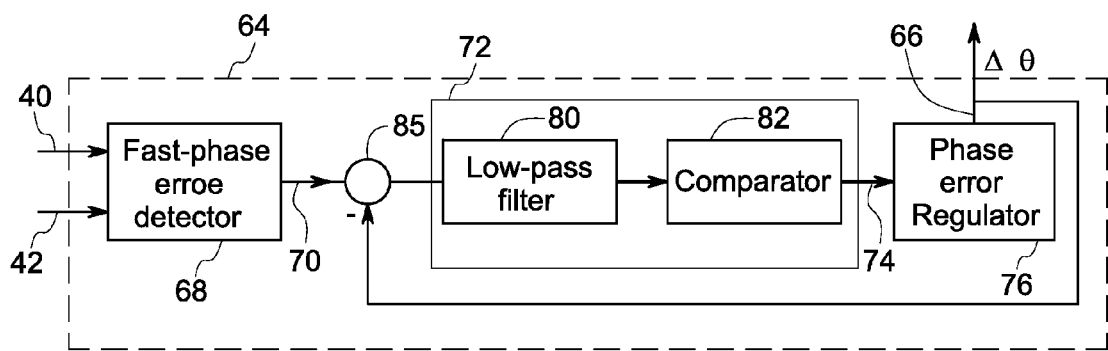
FIG. 5 is a block diagram of an exemplary phase compensation circuit of a conversion control system of the power distribution system of FIG. 12.

An exemplary block diagram of the phase compensation circuit 64 is illustrated in FIG. 5, which comprises a fast-phase-error-detector 68 for receiving the instantaneous three-phase reference signal ($V_a$, $V_b$, $V_c$) 40 and the synchronized phase signal ($\delta$) 42 of PLL circuit 32 to generate an instantaneous phase displacement signal 70, a noise rejecter 72 for filtering noises in the phase displacement signal 70 and sending a phase correction signal 74 when the phase displacement signal 70 exceeds a threshold value, and a phase error regulator 76 for generating phase compensation signal ($\Delta\theta$) 66.

In one embodiment of the invention, fast-phase-error-detector 68 performs a rotational transformation to calculate a phase error ($\theta$) and generates a phase displacement signal 70, which is a function of the phase error ($\theta$). In certain embodiments of the invention, phase displacement signal 70 is a monotonic signal with a phase error range of $-\pi < \theta < \pi$. In one embodiment, the phase displacement signal can be expressed as:

Phase error signal=$k_1 \times \sin(\theta/2)$, wherein $k_1$ is a constant coefficients with $k_1 > 1$. In one embodiment, $k_1 = 2$. In another embodiment, the phase displacement signal 70 is an arctangent function of a ratio of $V_q$ and $V_d$ according to:

Phase error signal=$k_1 \times a\tan 2(V_q, V_d)$.

In another embodiment, the phase displacement signal can also expressed as:

$$\text{Phase error signal} = k_1 \times \text{sgn}(V_q) \sqrt{\frac{1 - \frac{V_d}{\sqrt{V_d^2 + V_q^2}}}{2}}$$

With continued reference to FIG. 5, in certain embodiments, noise rejecter 72 comprises a low-pass filter 80 for removing high frequency noises and a comparator 82 for comparing the phase displacement signal 70 with threshold phase error signal. In one embodiment, the comparator 82 comprises a hysteresis control circuit and sends phase correction signal 74 to the phase error regulator 76 when the phase displacement signal 70 exceeds the threshold phase error signal.

In the illustrated embodiment of FIG. 5, phase error regulator 76 generates phase compensation signal ($\Delta\theta$) 66 by the phase correction signal 74 from noise rejecter 72 according to:

phase compensation signal=$k3 \times$phase correction signal, wherein 0<k3<2. In one embodiment, k=0.8. In the illustrated embodiment of FIG. 5, the phase compensation signal ($\Delta\theta$) 66 is subtracted from the phase displacement signal 70 by a summing junction 85 before the phase displacement signal 70 is sent to noise rejecter 72 for generation of the phase correction signal 74.

Referring back to FIG. 1, in one embodiment, the compensation phase signal ($\Delta\theta$) 66 is added to output signal 42 of PLL signal 32 to directly correct the synchronized phase angle ($\delta$) along route L1. In another embodiment, the compensation phase signal (Δθ) 66 is sent to DC voltage regulator 58 and the volt-VAR regulator 60, and the DC voltage regulator 58 and volt-VAR regulator 60 accordingly adjust the reference active and reactive current commands a ($I_{dr}$, $I_{qr}$) to obtain compensated reference current commands ($I_{dr-t}$, $I_{qr-t}$) according to:

$$I_{dr-t} = I_{dr} \times \cos \Delta\theta - I_{qr} \times \sin \Delta\theta$$

$$I_{qr-t} = I_{dr} \times \sin \Delta\theta + I_{qr} \times \cos \Delta\theta$$

In certain embodiments of the invention, PLL circuit 32 and phase compensation circuit 64 are combined as a stand-alone phase tracking circuit to be used in any power distribution system.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. For example, embodiments described above are illustrated with reference to a current controller receiving current reference commands, and three-phase current feedback signals, to generate control signal for the power conversion module. In other embodiments of the invention, the controller can be other controller such as a voltage controller receiving voltage commands and voltage feedback signals to generate a control signal for the power conversion module.

Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A power distribution system comprising:
   a power conversion module for performing power conversion between a DC voltage at a DC side and an AC power at an AC side, the AC side being electrically coupled to a grid; and
   a conversion control system comprising:
      a phase-locked-loop circuit for receiving a multi-phase reference signal of a grid voltage and for generating a synchronized signal;
      a regulator for receiving reference commands, a two-phase grid feedback signal, and the synchronized signal and for generating a control signal for the power conversion module; and
      a phase compensation circuit for receiving the synchronized signal and the multi-phase reference signal of the grid voltage, for obtaining a phase displacement signal, and for generating a phase compensation signal for compensating the reference commands or for compensating the synchronized signal when the phase displacement signal exceeds a threshold value.

2. The power distribution system according to claim 1 further comprising a power generation source electrically coupled to the DC side of the power conversion module for feeding power to the grid through the power conversion module.

3. The power distribution system according to claim 1, wherein the controller comprises a current controller, the reference commands comprise reference current commands, and the two-phase grid feedback signals comprise two-phase grid current signals.

4. The power distribution system according to claim 3, wherein the power conversion control system further comprises a converter for converting a measured multi-phase grid current signal into the two-phase grid current signal, a current regulator for generating a two-phase control signal according to the two-phase current signal, and a modulator for converting the two-phase control signal into a multiphase control signal.

5. The power distribution system according to claim 3, wherein the reference current commands comprises a reference active current command and a reference reactive power command, and wherein the power conversion control system further comprises a DC voltage regulator and a volt-VAR regulator, the DC voltage regulator for receiving a measured DC voltage at the DC side of the power conversion module and for generating the reference active current command, and the volt-VAR regulator for receiving a reactive power signal and for generating the reference reactive current command.

6. The power distribution system according to claim 5, wherein the phase compensation circuit is configured to send the phase compensation signal to the DC voltage regulator and the volt-VAR regulator for compensating the reference active and reactive current commands.

7. The power distribution system according to claim 1, wherein the phase compensation circuit comprises a fast-phase-error-detector for receiving the synchronized phase signal and the multi-phase reference signal and for obtaining the phase displacement signal.

8. The power distribution system according to claim 1, wherein the phase compensation circuit comprises a noise rejecter comprising a low-pass filter for removing high frequency signals in the phase displacement signal.

9. The power distribution system according to claim 1, wherein the phase compensation circuit comprises a noise rejecter comprising a comparator for comparing the phase displacement signal with the threshold value and for generating a phase correction signal when the phase displacement signal exceeds the threshold value.

10. The power distribution system according to claim 9, wherein the phase compensation circuit comprises a phase error regulator configured for generating a phase compensation signal according to the phase correction signal.

11. The power distribution system according to claim 10, wherein the phase compensation signal is subtracted from the displacement signal before the phase displacement signal is sent to the noise rejecter for generation of the phase correction signal.

12. A phase tracking circuit comprising:
a phase-locked-loop circuit comprising:
   a phase detector for receiving a multi-phase reference signal and feedback phase signal, for performing a rotational transformation to convert the multi-phase reference signal into a two-phase signal in a two-phase direct and quadrature reference frame, and for generating a phase error signal; and
   a phase regulator for receiving the phase error signal and generating a synchronized frequency signal; and
   an integrator for receiving the synchronized frequency signal and generating a synchronized phase signal; and
a phase-compensation circuit comprising:
   a fast-phase-error-detector for receiving the synchronized phase signal and the multi-phase reference signal, for generating a phase displacement signal, and for generating a phase compensation signal for compensating the synchronized phase signal from the phase-locked-loop circuit when the phase displacement signal exceeds a threshold value.

13. The phase tracking circuit according to claim 12, wherein the phase compensation circuit comprises a fast-phase-error-detector for receiving the synchronized phase signal from the phase-lock-loop circuit and the multi-phase reference signal and for generating the phase displacement signal.

14. The phase tracking circuit according to claim 13, wherein the phase displacement signal is an arctangent function of a ratio of the two-phase quantity in the quadrature reference frame and the two-phase quantity in the direction reference frame.

15. The phase tracking circuit according to claim 13, wherein the phase displacement signal is a sine function of a half of the phase error.

16. The phase tracking circuit according to claim 12, wherein the phase compensation circuit comprises a noise rejecter comprising a low-pass filter for removing a high frequency signal in the phase displacement signal.

17. The phase tracking circuit according to claim 12, wherein the phase compensation circuit comprises a noise rejecter comprising a comparator for comparing the phase displacement signal with the threshold value and for generating a phase correction signal when the phase displacement signal exceeds the threshold value.

18. The phase tracking circuit according to claim 12, wherein the phase compensation circuit comprises a phase error regulator configured for generating a phase compensation signal from the phase correction signal, wherein the phase compensation signal is k times the phase correction signal, and wherein k is in the range of 0 to 2.

19. The phase tracking circuit according to claim 12, wherein the phase compensation signal is subtracted from the displacement signal before the phase displacement signal is sent to the noise rejecter for generation of the phase correction signal.

* * * * *

UNITED STATES PATENT AND TRADEMARK OFFICE
CERTIFICATE OF CORRECTION

| | | Page 1 of 1 |
|---|---|---|
| PATENT NO. | : 8,014,181 B2 | |
| APPLICATION NO. | : 12/569160 | |
| DATED | : September 6, 2011 | |
| INVENTOR(S) | : Tan et al. | |

It is certified that error appears in the above-identified patent and that said Letters Patent is hereby corrected as shown below:

In Column 4, Line 19, delete "$V_a$," and insert -- $V_\alpha$ --, therefor.

Signed and Sealed this
Eighth Day of November, 2011

David J. Kappos
*Director of the United States Patent and Trademark Office*